April 11, 1950              J. J. HOST             2,503,389
MICROSCOPE WITH SELF-CONTAINED ILLUMINATOR
AND ROTATABLE DIAPHRAGM
Filed Oct. 18, 1946
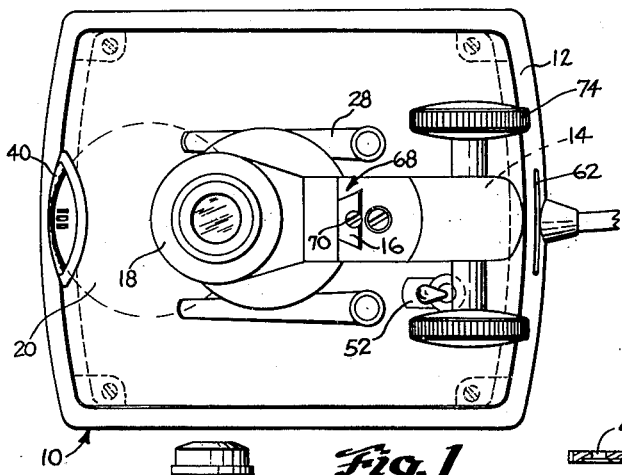
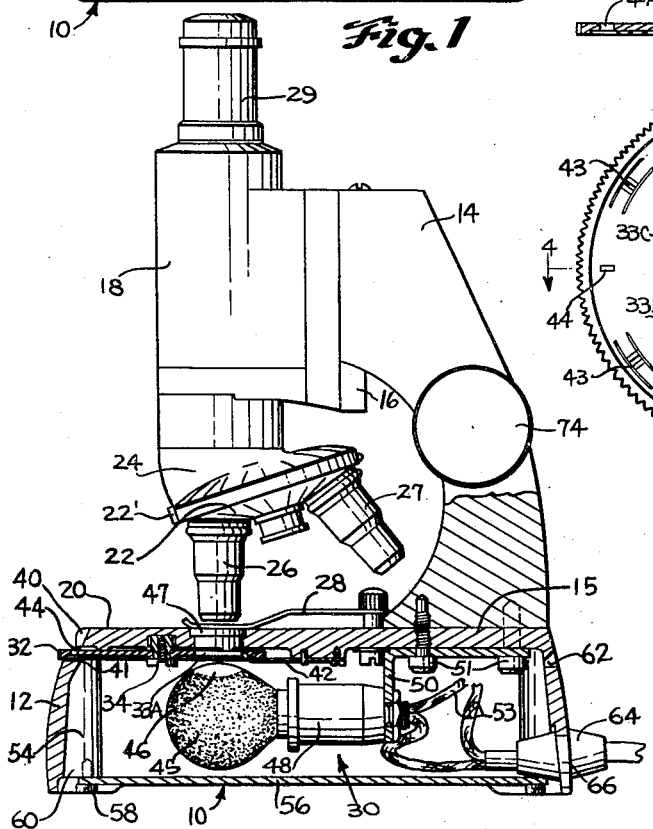
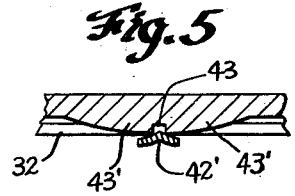
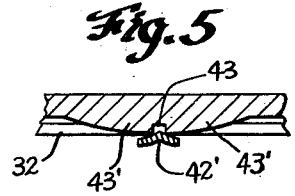
INVENTOR
JOHN J. HOST
BY
*Robt. S. Williams*
ATTORNEY Patented Apr. 11, 1950

2,503,389

UNITED STATES PATENT OFFICE 2,503,389

MICROSCOPE WITH SELF-CONTAINED ILLUMINATOR AND ROTATABLE DIAPHRAGM

John J. Host, Park Ridge, Ill., assignor to American Optical Company, Southbridge, Mass., a voluntary association of Massachusetts Application October 18, 1946, Serial No. 703,998

8 Claims. (Cl. 88—39)

This invention relates to microscopes and more particularly to a new and improved monocular microscope provided with a self-contained illuminating unit and suitable means for providing a plurality of medium and low powers of magnification in said microscope while also being of a convenient arrangement and of a sturdy, efficient and economical construction.

The monocular microscope of the present invention comprises a self-contained illuminating unit or housing which serves as a supporting base and encloses a light source and light controlling means. The upper wall of the housing is formed as a flat surface for providing a specimen support or stage for the microscope. This wall is apertured so as to allow light from within to pass therethrough for illuminating an haemacytometer slide or the like on the stage and the aperture is so shaped that it forms a support for light filtering means positioned therein. A supporting arm is secured near the rear of the upper wall of the housing and arranged to extend upwardly and curve forwardly and adjustably support a body tube so as to form therewith a convenient out-of-the-way space for a rotatable nose piece and objectives carried thereby. The parts of the microscope are so constructed and arranged that a clear unobstructed work space is formed adjacent the front of the stage of the instrument, and at least a large part of this space is readily visible to the operator of the instrument from a position adjacent the ocular or eye piece of the instrument thus facilitating changing or manipulating of slides or the like. In microscopes of former constructions, it was necessary to employ prisms or the like between the ocular and the objective in order to obtain such clear observation of the stage, slides and the like and this added materially to the construction costs of the instruments. In instruments of the present invention, however, the need and expense of such prisms or the like are eliminated. The improved microscope is also so constructed as to allow a portion of the light control means within the housing to project outwardly through the front wall thereof and expose aperture indicating characters so as to be likewise visible from a position closely adjacent the eye piece of the instrument.

It is, accordingly, an object of the present invention to provide a monocular microscope of the class disclosed which is of efficient and economical construction and which embodies a self-contained or built-in illuminating unit, a stage, light control means and a multiple objective nose piece so arranged as to provide a clear unobstructed work space adjacent the front part of the stage of the instrument. It is also an object of the invention to provide in such a monocular microscope a construction and arrangement wherein a material portion of the work space or stage is readily visible from a position closely adjacent the eye piece of the instrument. It is also an object of the invention to provide in such a monocular microscope light control means of a simple construction and provided with actuating means and aperture indicating means adjacent said work space or stage and clearly visible from a position adjacent the eye piece of the instrument. It is a further object of the invention to provide for a monocular microscope having a self-contained illuminating unit or housing light control means in the form of an inexpensive apertured diaphragm positioned within said unit or housing and arranged to have a portion thereof extending through a wall of said unit for providing conveniently accessible actuating means and readily visible aperture indicating means.

These and other objects and advantages reside in certain novel features of construction, arrangement and combination of parts as will hereinafter be more fully set forth and pointed out in the appended claims.

Referring to the drawing:

Fig. 1 is a plan view of a microscope embodying the present invention;

Fig. 2 is a side elevational view of the microscope of Fig. 1 and showing parts thereof broken away to more clearly reveal details of the invention;

Fig. 3 is an enlarged bottom view of the apertured diaphragm employed in the microscope of Fig. 2;

Fig. 4 is a sectional view taken substantially on line 4—4 of Fig. 3 and looking in the direction of the arrows; and Fig. 5 is an enlarged detailed showing of a portion of the diaphragm and detent means in engagement therewith.

Referring to the drawing in detail, numeral 10 indicates generally a microscope embodying a hollow supporting base or housing unit 12 having a forwardly curved supporting arm 14 secured to its upper wall 15 and arranged so that the upper end thereof slideably supports a movable supporting member 16 which carries a microscope body tube 18 for vertical adjustment of the objectives thereon relative to the upper surface 20 of wall 15, said surface serving as a work surface or stage for the microscope. In the present disclosure a pivotally mounted turret 22 is shown as part of a nose piece assembly 24 on the lower end of the body tube 18 and this turret is arranged to selectively support either an objective 26 or an objective 27 in alignment with the optical axis of the microscope so that a haemacytometer slide (not shown) may be positioned upon the surface 20 and held in place by spring clips 28 for observation through the eye piece 29 of the microscope. Obviously a turret for three or even four objectives could be used in place of turret 22 is desired. Suitable spring detent means is provided at 22' for holding either objective in aligned position.

A self-contained or built-in light source is indicated generally at 30 within housing unit 12 and the amount of light being supplied thereby to illuminate the specimen on the slide on the stage 20 may be controlled by a rotatable diaphragm 32 which has, as best shown in Fig. 3, a plurality of different size apertures formed therein and indicated as 33A, 33B, 33C, 33D and 33E. These apertures have their centers equally spaced from the center of the diaphragm and equally spaced from each other so that they may be selectively brought into axial alignment with the microscope body tube and an objective and eye piece aligned therewith by pivotal movement of the diaphragm about pivot means 34 secured to the under side of upper wall 15.

A recess 40 (see Fig. 1) is formed in the upper part of the front wall portion of the base 12 and a horizontal slot 41 extends inwardly therefrom and through the front wall of the housing to accommodate the peripheral edge portion of the diaphragm 32 so that the diaphragm may be conveniently moved by the finger of the operator of the microscope when changing from one diaphragm opening to another. A suitable detent in the form of a leaf spring 42 may be secured to the lower surface of the upper wall 15 and arranged to have an end portion 42' bent to engage in any one of a plurality of grooves or like formations 43 in the lower surface of the diaphragm and adjacent the apertures therein for properly centering and retaining each aperture of the diaphragm in place when adjusted into optically aligned position. Each centering groove may be formed, as shown in Fig. 5, by a pair of raised shoulders 43' having cam surfaces up either of which the detent portion 42' may ride before snapping into the groove. When the detent is disengaged from the groove and shoulders, the diaphragm is free for rotation. Obviously other forms of diaphragm retaining means could be used in place of the structure shown.

In order that the operator may readily determine which aperture is in alignment with the light source and microscope body tube, a series of numbers may be provided near the peripheral edge of the diaphragm, each being suitably positioned opposite its associated aperture, so that the numbers will be each separately exposed to view in the portion of the diaphragm extending through slot 41 when its respective aperture is in operative position. While various types of numbers may be used for the purpose, it has been found desirable to perforate the diaphragm 32 with small Roman numerals or the like, indicated at 44, which extend through the diaphragm so that light from the interior of said housing 12 may shine through the exposed numeral and be readily visible to the operator.

The light source 30, previously referred to, preferably comprises a tungsten filament bulb 45 having the major portion of its exposed surface silvered or coated to provide high light reflecting interior surface but has a circular portion 46 thereof left uncoated so that substantially all the light therefrom will be directed upwardly through the uncoated portion and the aligned aperture in the diaphragm and through a blue filter 47 cemented into a recess in the upper wall 15 of the base so that the light from bulb 45 will be filtered to provide nearly the equivalent of ordinary sunlight. The bulb 45 has a conventional screw threaded or bayonet slot type of engagement with a socket 48 which is clamped to a supporting bracket 50 and this bracket is in turn secured to the lower surface of the upper wall 15 by screws or the like 51 which also serve to secure supporting arm 14 to said base. A conventional snap switch 52 is provided in the electric circuit formed by leads 53 and is located near the rear of the upper wall of the housing 12 for controlling bulb 45.

The base or housing 12 is preferably formed of a molded or cast construction and is provided at spaced locations in the interior thereof with integral projections 54 each of which terminates a short distance above the lower supporting surface of the base so that an enclosing plate 56 may be secured by screws or the like 58 to these projections and serve to nearly completely enclose the bottom of said housing. The plate 56 is of slightly smaller size than the size of the opening in the bottom of the base so that a free space 60 is formed for the entrance of air into the interior for cooling the light source, and for allowing the escape of the heated air a slot or the like 62 may be formed in the upper central portion of the rear wall of the base. A rubber bushing 64 is provided on the electrical leads 53 and so shaped that a central circular grooved portion 66 thereof will slide into and frictionally engage a slot formed in the lower central portion of the rear wall of said housing 12.

The vertically adjustable supporting member 16 carrying the microscope body tube 18 is provided with suitable guide surfaces engaging complementary guide surfaces on the supporting arm 14 as indicated at 68. A stop means 70 is provided in the upper portion of member 16 and is arranged to engage the upper horizontal surface of the arm 14 for limiting the downward movement of the microscope body tube. Control knobs are shown at 74 and any one of various forms of adjustment mechanisms may be provided within arm 14 and associated therewith for vertically actuating the body tube 18 relative to the stage 20. A preferred form of mechanism, however, for this purpose is that disclosed by copending application Serial No. 703,967 filed of even date herewith in the name of Thomas G. Aitcheson.

From the foregoing it will be apparent that I am able to obtain the objects of the invention and provide a microscope having an improved and inexpensive construction and arrangement. Various modifications can, of course, be made in the structure disclosed without departing from the spirit of the invention or the scope of the appended claims.

I claim:

1. In a microscope of the character described an enclosed housing forming a supporting base for the microscope, the upper wall of said housing having a supporting surface forming a stage, a supporting arm secured to a rear portion of said housing and extended upwardly therefrom, a microscope body tube having its longitudinal axis extending toward said stage, said body tube being adjustably mounted on the upper end of said arm for movement along said axis and relative to said stage, an eye piece carried at the upper end of said body tube in alignment with said axis, a nose piece assembly mounted on the lower end of said body tube, said assembly comprising a rotatable member and a plurality of objectives for selective pivotal movement into alignment with said axis, the pivotal center of said member being disposed rearwardly of the axis of said body tube, an opening in said stage in alignment with said axis, a light source within said housing and adjacent said opening for transmitting light through said opening, a slot in the front wall of said housing, a pivotally mounted diaphragm within said housing provided with a plurality of apertures of different sizes disposed so as to be selectively moved into an aligned position between said light source and said opening for controlling the intensity of light passing therethrough, said diaphragm being so mounted within said housing that a peripheral portion thereof extends through said slot so as to be convenient for operation from the exterior thereof, whereby the portion of said stage forwardly of the opening therein is unobstructed and disposed toward the operator.

2. In a microscope of the character described an enclosed housing forming a supporting base for the microscope, the upper wall of said housing having a supporting surface forming a stage, a supporting arm secured to a rear portion of said housing and extended upwardly therefrom, a microscope body tube having its longitudinal axis extending toward said stage, said body tube being adjustably mounted on the upper end of said arm for movement along said axis and relative to said stage, an eye piece carried at the upper end of said body tube in alignment with said axis, a nose piece assembly mounted on the lower end of said tube, said assembly comprising a rotatable member and a plurality of objectives for selective pivotal movement into alignment with said axis, the pivotal center of said member being disposed rearwardly of the axis of said body tube, an opening in said stage in alignment with said axis, a light source within said housing and adjacent said opening for transmitting light through said opening, a slot in the front wall of said housing, a pivotally mounted diaphragm within said housing provided with a plurality of apertures of different sizes disposed so as to be selectively moved into an aligned position between said light source and said opening for controlling the intensity of light passing therethrough, said diaphragm being so mounted within said housing that a peripheral portion thereof extends through said slot, and a plurality of aperture indicating reference characters carried by said peripheral portion in such spaced relation that each is individually and separately visible to the operator of the instrument from a position adjacent the eye piece thereof when the aperture associated therewith is positioned adjacent the opening in said stage, and whereby the portion of said stage forwardly of said opening will be unobstructed and disposed toward the operator.

3. In a microscope of the character described an enclosed housing forming a supporting base for the microscope, the upper wall of said housing having a supporting surface forming a stage, a supporting arm secured to a rear portion of said housing and extended upwardly therefrom, a microscope body tube having its longitudinal axis extending toward said stage, said body tube being adjustably mounted on the upper end of said arm for movement along said axis and relative to said stage, an eye piece carried at the upper end of said body tube in alignment with said axis, an objective mounted on the lower end of said body tube in alignment with the axis of said body tube, an opening in said upper wall in alignment with said axis, a light source within said housing and adjacent said opening for transmitting light through said opening, a slot in the front wall of said housing, a pivotally mounted diaphragm within said housing provided with a plurality of apertures of different sizes arranged to be selectively moved into a position between said light source and said opening for controlling the intensity of light passing therethrough, the pivot means for said diaphragm being carried by said housing forwardly of said opening so that a peripheral portion thereof extends through said slot, and a plurality of aperture indicating reference characters carried by said peripheral portion in such spaced relation that each is individually and separately visible to the operator of the instrument from a position adjacent the eye piece thereof when the aperture associated therewith is positioned adjacent said opening.

4. In a microscope of the character described an enclosed housing forming a supporting base for the microscope, the upper wall of said housing having a supporting surface forming a stage, a supporting arm secured to a rear portion of said housing and extended upwardly therefrom, a microscope body tube having its longitudinal axis extending toward said stage, said body tube being adjustably mounted on the upper end of said arm for movement along said axis and relative to said stage, an eye piece carried at the upper end of said body tube in alignment with said axis, an objective mounted on the lower end of said body tube in alignment with the axis of said body tube, an opening in said upper wall in alignment with said axis, a light source within said housing and adjacent said opening for transmitting light through said opening, a pivotally mounted diaphragm within said housing provided with a plurality of apertures of different sizes arranged to be selectively moved into a position between said light source and said opening for controlling the intensity of light passing therethrough, a recess formed in the front wall of said housing and a slot extending from said recess to the interior of said housing, the pivot means for said diaphragm being carried by said housing forwardly of said opening so that a peripheral portion thereof extends through said slot and into said recess so as to be convenient for operation from the exterior of said housing.

5. In a microscope of the character described an enclosed housing forming a supporting base for the microscope, the upper wall of said housing having a supporting surface forming a stage, a supporting arm positioned adjacent the rear portion of said housing and extended upwardly therefrom, a microscope body tube having its longitudinal axis extending toward said stage, said body tube being adjustably mounted on the upper end of said arm for movement along said axis and relative to said stage, an eye piece carried at the upper end of said body tube in alignment with said axis, an objective mounted on the lower end of said body tube in alignment with the axis of said body tube, an opening in said upper wall in alignment with said axis, a light source within said housing and adjacent said opening for transmitting light through said opening, said light source being disposed so that its longest dimension extends horizontally in said housing, the vertical internal dimension of said housing in the region adjacent said light source being only slightly greater than the transverse dimension of said light source, a bracket for supporting said light source, common means for clamping said bracket and said supporting arm to opposed surfaces of said housing with said light source aligned with said axis, a pivotally mounted diaphragm within said housing provided with a plurality of apertures of different sizes arranged to be selectively moved into a position between said light source and said opening for controlling the intensity of light passing therethrough, a slot in the front wall of said housing, said diaphragm being so mounted within said housing that a peripheral portion thereof extends through said slot so as to be convenient for operation from the exterior of the housing.

6. In a microscope of the character described an enclosed housing forming a supporting base for the microscope, the upper wall of said housing having a supporting surface forming a stage, a supporting arm positioned adjacent the rear portion of said housing and extending upwardly therefrom, a microscope body tube having its longitudinal axis extending toward said stage, said body tube being adjustably mounted on the upper end of said arm for movement along said axis and relative to said stage, an eye piece carried at the upper end of said body tube in alignment with said axis, a nose piece assembly mounted on the lower end of said body tube, said assembly comprising a rotatable member and a plurality of objectives for selective pivotal movement into alignment with said axis, the pivotal center of said rotatable member being disposed rearwardly of the axis of said body tube, an opening in said upper wall in alignment with said axis, a light source within said housing and adjacent said opening for transmitting light through said opening, said light source being disposed so that its longest dimension extends horizontally in said housing, the vertical internal dimension of said housing in the region adjacent said light source being only slightly greater than the transverse dimension of said light source, a bracket for supporting said light source, common means for clamping said bracket and said supporting arm to opposed surfaces of said housing with said light source aligned with said axis, a pivotally mounted diaphragm within said housing provided with a plurality of apertures of different sizes arranged to be selectively moved into a position between said light source and said opening for controlling the intensity of light passing therethrough, a slot in the front wall of said housing, said diaphragm being so mounted within said housing that a peripheral portion thereof extends through said slot so as to be convenient for operation from the exterior of the housing, whereby the portion of said stage forwardly of said opening therein is unobstructed and disposed toward the operator.

7. In a microscope of the character described an enclosed housing forming a supporting base for the microscope, the upper wall of said housing having a supporting surface forming a stage, a supporting arm secured to a rear portion of said housing and extending upwardly therefrom, a microscope body tube having its longitudinal axis extending toward said stage, said body tube being adjustably mounted on the upper end of said arm for movement along said axis and relative to said stage, an eye piece carried at the upper end of said body tube in alignment with said axis, an objective located at the lower end of said body tube and aligned with said axis, an opening in said upper wall in alignment with said axis, a light source within said housing and adjacent said opening for transmitting light through said opening, a slot in the front wall of said housing, a pivotally mounted diaphragm within said housing provided with a plurality of apertures of different sizes arranged to be selectively moved into a position between said light source and said opening for controlling the intensity of light passing therethrough, the pivot means for said diaphragm being so mounted on said housing that a peripheral portion thereof extends outwardly through said slot, and a plurality of aperture indicating reference characters carried by said peripheral portion and arranged so as to be separately exposed to view outwardly of said housing when the aperture associated therewith is positioned adjacent said opening, each of said reference characters being so formed and so positioned relative to said slot that it is illuminated by light from the interior of said housing.

8. In a microscope of the character described an enclosed housing forming a supporting base for the microscope, the upper wall of said housing having a supporting surface forming a stage, a supporting arm carried by the rear portion of said housing and extending upwardly therefrom, a microscope body tube having its longitudinal axis extending toward said stage, said body tube being adjustably mounted on the upper end of said arm for movement along said axis and relative to said stage, an eye piece carried by the upper end of said body tube, an objective mounted on the lower end of said body tube, an opening in said upper wall in optical alignment with said objective and eye piece, a light source supported within said housing and closely adjacent said opening for transmitting light through said opening, said light source being so disposed that its longest dimension extends substantially horizontally in said housing, the vertical internal dimension of said housing in the region adjacent said light source being only slightly greater than the transverse dimension of said light source, a pivotally mounted diaphragm within said housing provided with a plurality of apertures of different sizes arranged to be selectively moved into a position between said light source and said opening for controlling the intensity of light passing therethrough, a slot in the front wall of said housing, said diaphragm being so mounted within said housing that a peripheral portion thereof extends through said slot so as to be convenient for operation from the exterior thereof.

JOHN J. HOST.

REFERENCES CITED

The following references are of record in the file of this patent:

UNITED STATES PATENTS

| Number | Name | Date |
| --- | --- | --- |
| 328,277 | Bausch | Oct. 13, 1885 |
| 1,461,367 | Ott et al. | July 10, 1923 |
| 1,512,785 | Mittasch | Oct. 21, 1924 |
| 1,631,329 | Patterson | June 7, 1927 |
| 2,056,421 | Cooper | Oct. 6, 1936 |
| 2,135,870 | Fassin | Nov. 8, 1938 |
| 2,206,180 | Gerstenberger et al | July 2, 1940 |